United States Patent

Shiga

Patent Number: 5,859,599
Date of Patent: Jan. 12, 1999

[54] KEYBOARD

[75] Inventor: Sadakazu Shiga, Fukushima-ken, Japan

[73] Assignee: Alps Electric Co., Ltd., Tokyo, Japan

[21] Appl. No.: 850,968

[22] Filed: May 5, 1997

[30] Foreign Application Priority Data

May 16, 1996 [JP] Japan ..................................... 8-121632

[51] Int. Cl.$^6$ .................................................. H03K 17/94
[52] U.S. Cl. ................................ 341/21; 341/22; 341/26; 341/173; 345/168
[58] Field of Search ........................... 364/189; 345/168; 341/22, 23, 24, 25, 26, 173, 21; 400/477, 480

[56] References Cited

U.S. PATENT DOCUMENTS 5,307,297  4/1994  Iguchi et al. ......................... 364/708.1
5,406,273  4/1995  Nishida et al. ............................. 341/24

FOREIGN PATENT DOCUMENTS 2-304611  12/1990  Japan .

*Primary Examiner*—Michael Horabik
*Assistant Examiner*—Timothy Edwards, Jr.
*Attorney, Agent, or Firm*—Brinks Hofer Gilson & Lione

[57] ABSTRACT

A keyboard for lowering the power consumption for key code transmission and enhancing the reliability in code transmission. When key codes corresponding to an operated key in the laid out keys are transmitted to a signal processing unit, a status code indicating whether a function key (Shift, Control or Alt key) has been operated is also transmitted at the same time, transmitting no key-on repeat code that is obtained when one key is operated continuously as with a conventional keyboard.

4 Claims, 5 Drawing Sheets

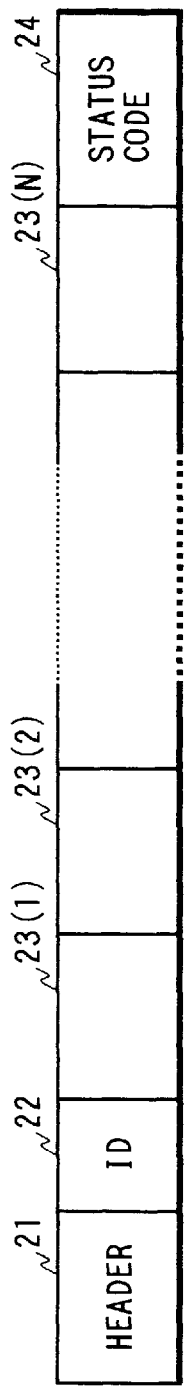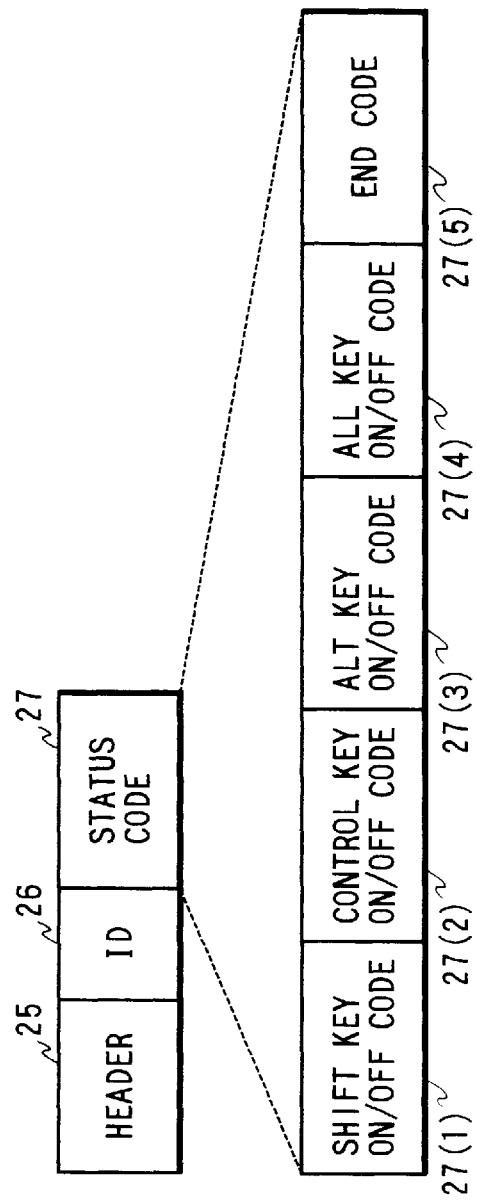

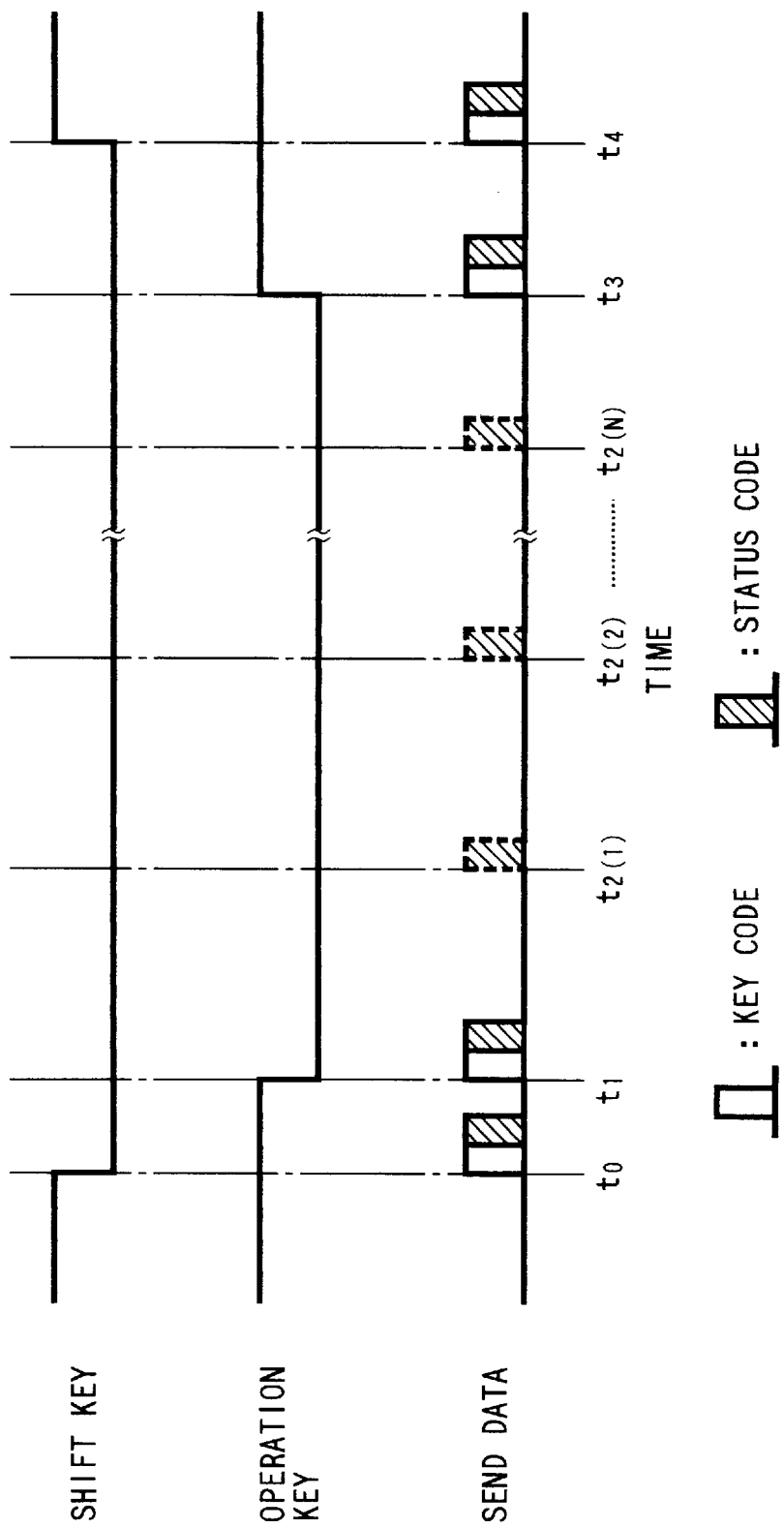

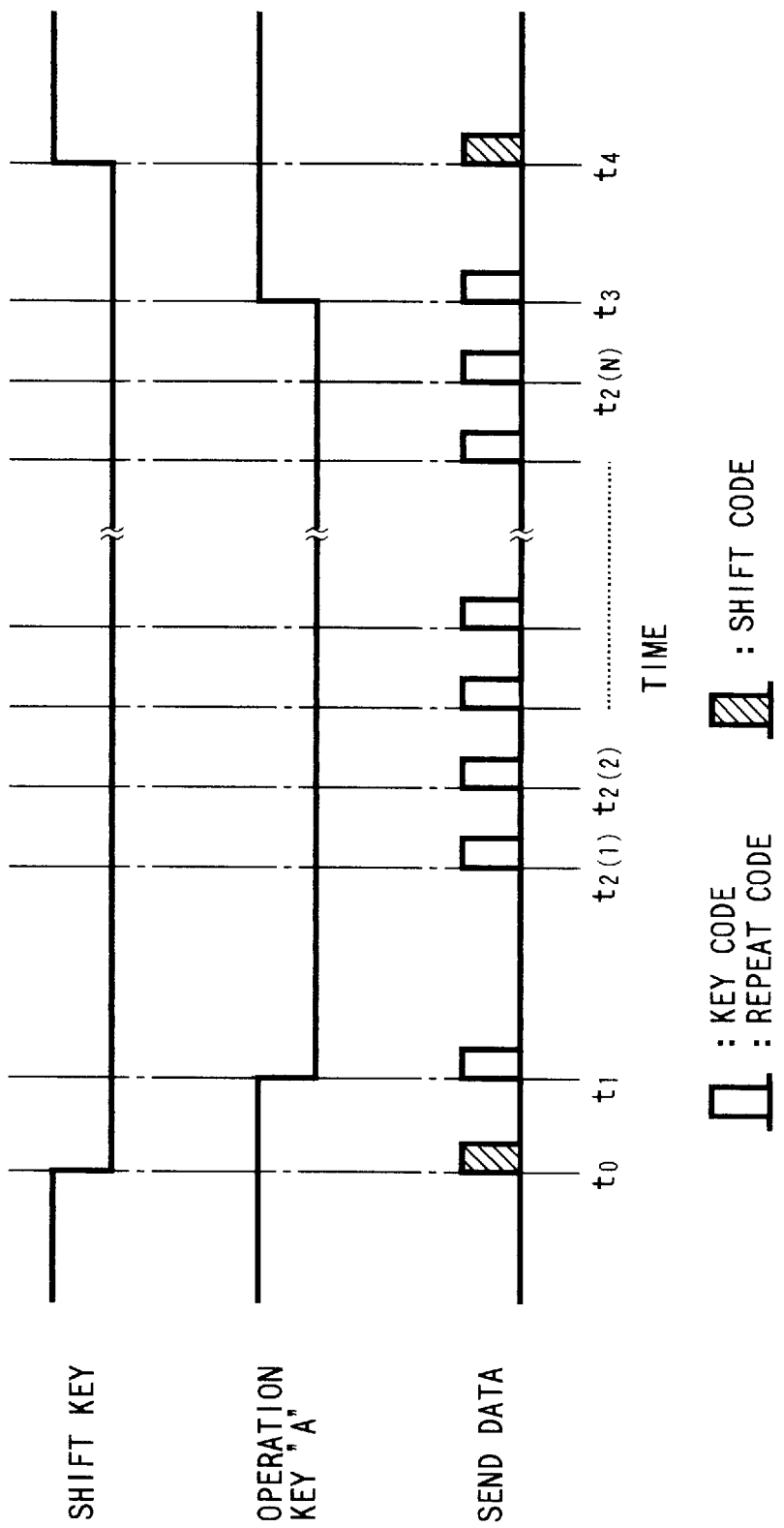

KEYBOARD

BACKGROUND OF THE INVENTION

The present invention relates to a keyboard and, more particularly, to a keyboard for reducing the power consumption thereof when transmitting key codes therefrom and, at the same time, enhancing the reliability in the key code transmission.

Generally, a keyboard is used as connected to a signal processing unit such as a personal computer by cable and has a key matrix with many keys laid out, an input/output circuit for performing input/output operations with the key matrix, a controller for controlling the entire operation of the keyboard, a clock signal generator for forming a clock signal for obtaining a scan signal, a display device for indicating a key-operated state and so on, an interface circuit for providing interface between the keyboard and the signal processor, and a built-in power supply.

FIG. 4 shows a block diagram illustrating an example of the constitution of a known keyboard.

Referring to FIG. 4, a keyboard 40 comprises a key matrix 41 with many keys laid out, an input/output (I/O) circuit 42 for receiving data associated with key operations from the key matrix 41, a controller (CPU) 43 for controlling the entire operation of the keyboard 40, an interface (I/F) circuit 44 for providing interface between the keyboard 40 and the signal processor (not shown) such as a personal computer, a clock signal generator 45 for forming a clock signal for obtaining a signal for scanning the key matrix 41, a ROM 46 for storing a program for operating the controller 43, a RAM 47 for use in the data processing by the controller 43, a display device (IND)48 for indicating a key-operated state and so on, a cable 49 for connecting the interface circuit 44 to the signal processor, and a built-in power supply 50.

In the above-mentioned prior-art constitution, the controller 43 performs various operations as follows. First, the controller 43 generates a scan signal for sequentially scanning horizontally and vertically the keys arranged on the keyboard. Second, the controller 43 receives switch data corresponding to an operated key when the keys have been scanned. Third, the controller 43 converts the received switch data to a key code (or a keyboard code) to be transmitted to the signal processor. Fourth, the controller 43 transmits the switch code to the signal processor via the interface circuit 44 and the cable 49. Fifth, the controller 43 transmits required display data to the display device 48. Sixth, the controller 43 executes required signal processing in response to command data supplied from the signal processor via the cable 49.

The keyboard 40 having the above-mentioned constitution operates as follows in general.

When any of the keys arranged on the key matrix 41 are operated, the controller 43 sequentially receives the switch data corresponding to the operated keys via the input/output circuit 42. Then, the controller 43, based on the operating program stored in the ROM 46, converts the switch data to key codes by use of the RAM 47 and transmits sequentially the obtained key codes to the signal processor via the interface circuit 44 and the cable 49. If, during or immediately before or after this transmission, some command data is supplied from the signal processor to the controller 43, the controller 43 performs a control operation corresponding to that command data.

FIG. 5 shows a timing chart describing the transmission timing of codes to be transmitted from the keyboard 40 when the Shift key and one operation key are operated simultaneously.

As shown in FIG. 5, in the keyboard 40 of FIG. 4, if one of the operation keys, for example key "A", is operated continuously (between time $t_1$ and time $t_3$) with the Shift key, one of the function keys, operated (between time to and time $t_4$), a shift-on code indicating a key-on operation of the Shift key is transmitted at time $t_0$, a key-on code A indicating a key-on operation of the key "A" is transmitted at time $t_1$, key-on repeat codes A of the operation key "A" are sequentially transmitted at times $t_{2(1)}, t_{2(2)}, \ldots, t_{2(N)}$, a key-off code A indicating a key-off operation of the operation key "A" is transmitted at time $t_3$, and a shift-off code indicating a key-off operation of the Shift key is transmitted at time $t_4$.

The above-mentioned operation holds true with other function keys such as Control and Alt keys.

In the known keyboard 40, if one of the operation keys, the key "AA" for example, is operated continuously (key on), the key-on repeat codes A are sequentially transmitted at short time intervals while the operation key "A" is being operated after the key-on code A is transmitted at the start of the key operation, and the key-off code A is transmitted at the end of the key operation as shown in FIG. 5, thereby terminating the transmission of a series of data for the operation of the operation key "A".

Also, in the known keyboard 40, if the Shift key, one of the function keys, is held operated (key on) at the time of the continuous operation of the operation key "A" for example, a shift-on code is transmitted at starting the operation of the Shift key as shown in FIG. 5 and a shift-off code is transmitted at the end of the Shift key operation, in addition to the above-mentioned data transmission.

As described, in the known keyboard 40, when an operation key is operated continuously, key-on repeat codes are transmitted, so that the power consumed for this transmission amounts to a degree that is not negligible. Especially, when the keyboard is driven by its built-in power supply, the power consumption by the transmission of key-on repeat codes shortens the service life of the power supply.

Further, in the known keyboard 40, if a function key such as the Shift key is operated immediately before an operation key is operated, the timing of transmitting the shift-on code at starting Shift key operation differs from the timing of transmitting the key-on code and the key-off code generated by the operation of the operation key, making it possible to fail the transmission of the shift-on code.

Still further, in the known keyboard 40, wireless transmission such as optical transmission is affected by noise and so on more than cable transmission, thereby lowering the reliability in code transmission.

SUMMARY OF THE INVENTION

It is therefore an object of the present invention to provide a keyboard for reducing the power consumption for key code transmission and enhancing the reliability in the code transmission in a wireless manner.

In carrying out the invention and according to one aspect thereof, there is provided a keyboard comprising: a key code generating section for generating a key code corresponding to an operated key among a plurality of laid out keys; and a key code transmitting section for transmitting the key code to a signal processing unit; wherein, when transmitting the key code from the key code transmitting section, a status code indicating whether a function key among the plurality of laid out keys is in an operated state is also transmitted.

In the above aspect of the invention, if the key is operated continuously, only the status code is transmitted from the key code transmitting section without transmitting the key code.

Further, in the keyboard, the status code is transmitted intermittently.

In the aforesaid keyboard, the function key is one of Shift key, Control key, and Alt key.

Furthermore, the keyboard further comprising an identification code generating section for generating an identification code unique to the keyboard, wherein the identification code is transmitted along with the key code and the status code from the key code transmitting section.

According to the above-mentioned novel constitution, when one of a plurality of keys is operated and a key code obtained based on the key operation is transmitted, a key-on code and a status code are transmitted simultaneously followed by the transmission of a key-off code and the status code without transmitting a key-on repeat code, so that the power otherwise consumed by the key-on repeat code transmission can be saved.

In addition, when one of the plurality of keys is operated and a key code obtained based on the key operation is transmitted, at least the status code is transmitted repeatedly along with the transmission of the key-on and key-off codes of the operated key, so that the drop in transmission of the status code that may be caused by the difference in transmission timing can be prevented, thereby enhancing the reliability in code transmission.

The above and other objects, features and advantages of the present invention will become more apparent from the accompanying drawings, in which like reference numerals are used to identify the same or similar parts in several views.

BRIEF DESCRIPTION OF THE DRAWINGS

FIGS. 2A and 2B are diagrams illustrating examples of the formats of codes transmitted from the keyboard of FIG. 1;

FIG. 3 is a timing chart indicating the timings of key codes transmitted from the keyboard of FIG. 1 when the Shift key and one operation key are operated simultaneously;

FIG. 5 is a timing chart indicating the timings of keys codes transmitted from the keyboard of FIG. 4 when the Shift key and one operation key are operated simultaneously.

DETAILED DESCRIPTION OF THE PREFERRED EMBODIMENT

This invention will be described in further detail by way of example with reference to the accompanying drawings.

Figure 1:
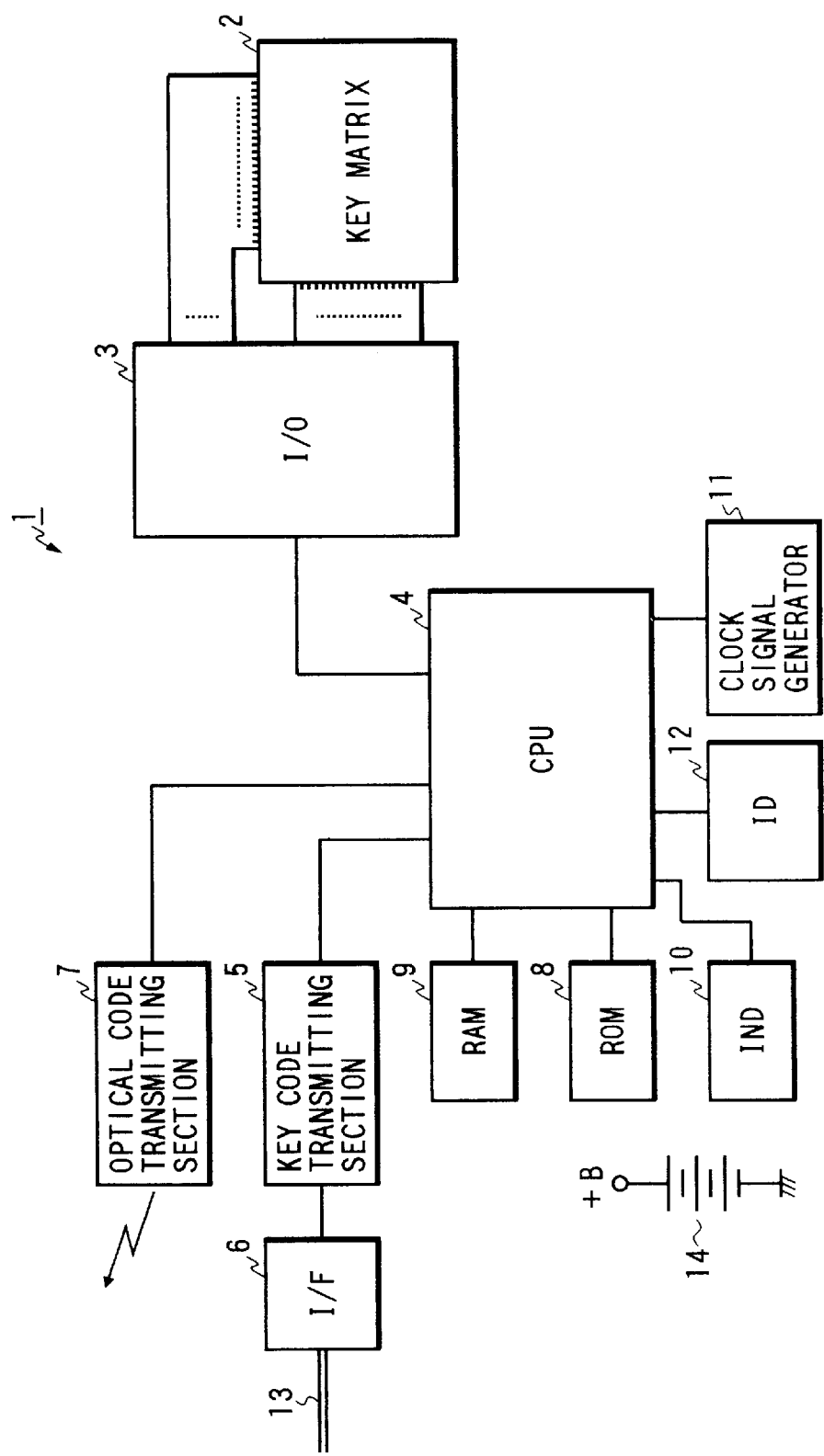
FIG. 1 is a block diagram illustrating the keyboard practiced as one preferred embodiment of the present invention.
Figure 4:
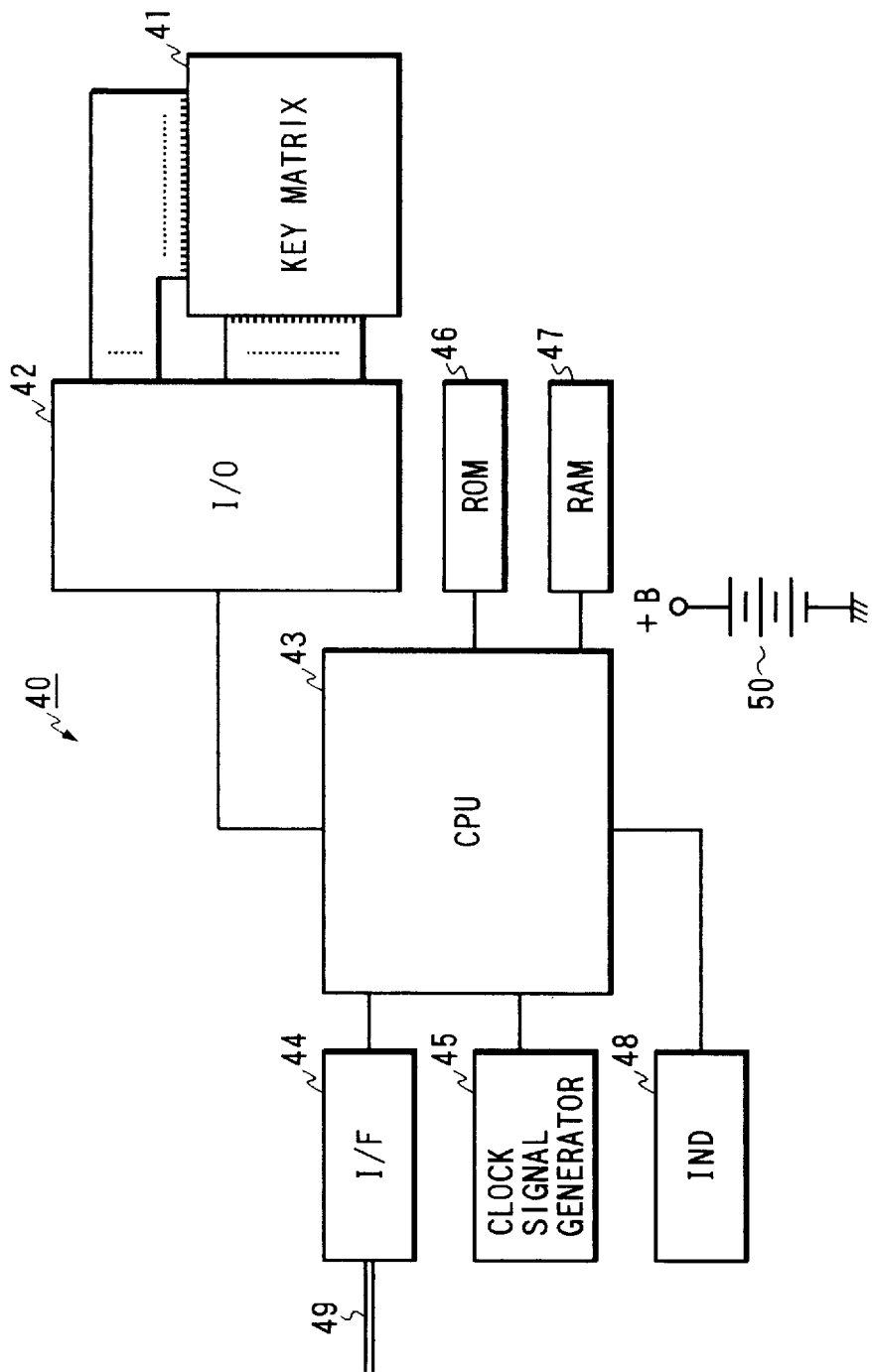
FIG. 4 is a block diagram illustrating a prior-art keyboard.

FIG. 1 shows the block diagram illustrating a constitution of the keyboard practiced as one preferred embodiment of the present invention.

Referring to FIG. 1, a keyboard 1 comprises a key matrix 2, an input/output (I/O) circuit 3, a controller (CPU) 4, a key code transmitting section 5, an interface (I/F) circuit 6, an optical code transmitting section 7, a ROM 8, a RAM 9, a display device (IND) 10, a clock signal generator 11, an ID circuit 12, a cable 13, and a built-in power supply 14.

The key matrix 2 has many keys laid out therein and is scanned horizontally (X axis) and vertically (Y axis) by a scan signal supplied from the input/output circuit 3. The key code transmitting section 5 is connected at the input thereof to the controller 4 and at the output thereof to the input of the interface circuit 6. The output of the interface circuit 6 is connected to the cable 13. The optical code transmitting section 7 has a light emitting diode (not shown), the input thereof being connected to the controller 4. The ROM 8 and the RAM 9 are both connected to the controller 4. The display device 10 has one or more indicators made of a light emitting diode or the like and is connected to the controller 4. The clock generator 11 is connected at the output thereof to the controller 4. The ID circuit 12 selects the ID unique to the keyboard 1 and is connected to the controller 4. The build-in power supply 14 supplies power to the controller 4 and so on, the output of the power supply being connected to the power supply terminal +B.

The keys arranged in the key matrix 2 are always scanned horizontally (X) and vertically (Y) by a scan signal supplied from the controller 4 via the input/output circuit 3. At this moment, if any of the keys is operated, data indicating the type and operated state of the operated key is supplied to the controller 4 via the input/output circuit 3. The controller 4 converts the supplied data into a key code that indicates the type and the operated state (whether it was operated consecutively or in a one-shot manner) of the operated key and, at the same time, forms a status code to be described later in detail. The key code transmitting section 5 amplifies the received combination of key code and status code or a single status code by a buffer amplifier (not shown) and supplies the amplified codes to the interface circuit 6. The interface circuit 6 sets the received key code and status code or the single status code to a code to be interfaced with a host signal processing unit (not shown) such as a personal computer or the like and transmits the resultant code to the host signal processing unit via the cable 13. The optical code transmitting section 7 amplifies the key code and status code or the single status code received from the controller 4 by a buffer amplifier (not shown) and supplies the amplified codes to the light emitting diode, from which the codes are transmitted to the host signal processing unit as an optical signal. The ROM 8 stores a operating program for operating the controller 4. The RAM 9 is used by the controller 4 for data conversion or other operations. The display device 10 shows the states of operations of the controller 4 appropriately. The clock signal generator 11 generates a clock signal for obtaining the scan signal for scanning the key matrix 2. The ID circuit 13 selects the ID unique to the keyboard 1.

FIG. 2 shows examples of the formats of codes transmitted from the keyboard 1. 2A shows a transmission code format to be used when a key code and a status code are transmitted simultaneously. 2B shows a transmission code data to be used when a single status code is transmitted.

As shown in 2A, the code format for the simultaneous transmission of key and status codes is composed of a header 21, an ID code 22, a plurality of key-on or key-off codes 23(1), 23(2), . . . , 23(N), and a status code 24. On the other hand, the code format to be used when only a single status code is transmitted is composed of a header 25, and ID code 26, and a status code 27. The status code 27 is composed of a Shift key on/off code 27(1), a Control key on/off code 27(2), an Alt key on/off code 27(3), an all-function key (All key) on/off code 27(4), and an end code 27(5). The Shift key on/off code 27(1), the Control key on/off code 27(2), and the Alt key on/off code 27(3) are each "0" when on and "1" when off. The All key on/off code 27(4) is "0" when the All key is off and "1" when any key is on.

FIG. 3 shows transmission timings of the codes transmitted from the keyboard 1 when the Shift key and one of the operation keys are operated simultaneously.

As shown in FIG. 3, in the keyboard 1 of the present embodiment, if, with the Shift key operated (between time $t_0$ and time $t_4$), one of the operation keys, for example the key "A" is operated repeatedly (between time $t_1$ and time $t_3$), a shift-on code indicating that the Shift key has been keyed on and a status code indicating the on-code of the Shift key are transmitted at time t0 together. Next, at time $t_1$, a key-on code A indicating that the key "A" has been keyed on a status code indicating the on-code of the Shift key are transmitted together. Then, at each of times $t_{2(1)}, t_{2(2)}, \ldots, t_{2(N)}$, a status code indicating the on-code of the Shift key is transmitted, followed at time $t_3$ by a key-off code A that the key "A" has been keyed off and a status code indicating the on-code of the Shift key. At time $t_4$, a shift-off code indicating that the Shift key has been keyed off and a status code indicating the off-code of the all-function key (All key) are transmitted.

In the above-mentioned embodiment, the single status code indicating the on-code of the Shift key is transmitted intermittently, for example every second, between time $t_1$ and time $t_3$. It will be apparent that this transmission of the single status code may be omitted.

In the above-mentioned embodiment, the Shift key is used as a function key for example. It will be apparent that the same operation takes place if other function keys such as the Control key and the Alt key are keyed on.

As described and according to the present invention, when one of the keys is operated and key codes obtained by that operation are transmitted, a key-on code and a status code are first transmitted simultaneously and then separate status codes are transmitted or no code is transmitted (or no repeat code is transmitted), followed finally by the simultaneous transmission of a key-off code and a status code. This novel constitution therefore eliminates the power consumption required by the transmission of key-on repeat codes as with the prior-art technology, thereby saving the power at code transmission.

Further, according to the present invention, when one of the keys is operated and key codes obtained by that operation are transmitted, a status code is transmitted repeatedly at transmission of the key-on and key-off codes of the operated key. This novel constitution prevents the drop of status codes in transmission due to the difference between transmission timings when operation keys are operated and, at the same time, enhances the reliability in code transmission in a wireless manner as by optical transmission.

Still further, according to the present invention, when one of the keys is operated and key codes obtained by that operation are transmitted, a key-on code and a status code are first transmitted simultaneously and then a key-off code and a status code are finally transmitted simultaneously, transmitting no key-on repeat code in between. This novel constitution eliminates the power consumption required by the transmission of key-on repeat codes as with the prior-art technology, thereby saving the power at code transmission.

Finally, according to the present invention, when one of the keys is operated and key codes obtained by that operation are transmitted, at least a status code is transmitted repeatedly at transmission of the key-on and key-off codes of the operated key. This novel constitution prevents the drop of status codes if there is a difference between transmission timings due to the difference between key operation timings, thereby enhancing the reliability in code transmission.

While the preferred embodiment of the present invention has been described using specific terms, such description is for illustrative purposes only, and it is to be understood that changes and variations may be made without departing from the spirit or scope of the appended claims.

What is claimed is:

1. A keyboard comprising:

a key code generating section for generating a key code corresponding to an operated key among a plurality of laid out keys; and a key code transmitting section for transmitting said key code to a signal processing unit;

wherein, when transmitting said key code from said key code transmitting section, a status code indicating whether a function key among said plurality of laid out keys is in an operated state is also transmitted and if the operated key is operated continuously, only said status code is transmitted from said key code transmitting section without transmitting said key code.

2. The keyboard as claimed in claim 1, wherein said status code is transmitted intermittently.

3. The keyboard as claimed in claim 1, wherein said function key is one of Shift key, Control key, and Alt key.

4. The keyboard as claimed in claim 1 further comprising an identification code generating section for generating an identification code unique to said keyboard, wherein said identification code is transmitted along with said key code and said status code from said key code transmitting section.

* * * * *